US010433582B2

(12) United States Patent
Bernauer et al.

(10) Patent No.: US 10,433,582 B2
(45) Date of Patent: Oct. 8, 2019

(54) MONOLITHIC PLANE WITH ELECTRICAL CONTACTS AND METHODS FOR MANUFACTURING THE SAME

(71) Applicant: Philip Morris Products S.A., Neuchatel (CH)

(72) Inventors: Dominique Bernauer, Neuchatel (CH); Felix Fernando, Basingstoke (GB)

(73) Assignee: Philip Morris Products S.A., Neuchatel (CH)

( * ) Notice: Subject to any disclaimer, the term of this patent is extended or adjusted under 35 U.S.C. 154(b) by 234 days.

(21) Appl. No.: 15/126,430

(22) PCT Filed: Mar. 9, 2015

(86) PCT No.: PCT/EP2015/054823
§ 371 (c)(1),
(2) Date: Sep. 15, 2016

(87) PCT Pub. No.: WO2015/139985
PCT Pub. Date: Sep. 24, 2015

(65) Prior Publication Data
US 2017/0094998 A1    Apr. 6, 2017

(30) Foreign Application Priority Data
Mar. 19, 2014    (EP) .................................... 14160681

(51) Int. Cl.
*A24F 47/00*    (2006.01)
*A61M 15/06*    (2006.01)
*B23P 19/00*    (2006.01)

(52) U.S. Cl.
CPC ............ *A24F 47/008* (2013.01); *B23P 19/00* (2013.01)

(58) Field of Classification Search
None
See application file for complete search history.

(56) References Cited

U.S. PATENT DOCUMENTS

| 5,278,584 A | 1/1994 | Keefe et al. |
| 5,612,585 A | 3/1997 | Verschueren |

(Continued)

FOREIGN PATENT DOCUMENTS

| CN | 102665459 A | 9/2012 |
| CN | 202873794 U | 4/2013 |

(Continued)

OTHER PUBLICATIONS

Combined Chinese Office Action and Search Report dated Oct. 17, 2018 in Chinese Patent Application No. 201580011451.8 (with English translation), citing documents AA, AO, and AP therein, 10 pages.

(Continued)

*Primary Examiner* — Thor S Campbell
(74) *Attorney, Agent, or Firm* — Oblon, McClelland, Maier & Neustadt, L.L.P.

(57) ABSTRACT

An electrically operated aerosol generating device is provided, including an electrical power supply; an electronic circuit board; an electrical heating element configured to receive power from the electrical power supply via the electronic circuit board; and a ground plane comprising an elongate conductive member configured to electrically couple the power supply to the electronic circuit board and the electrical heating element, and to structurally retain the power supply and plurality of components of the electrically operated aerosol generation device. There is also provided a ground plane, and a single laminar blank configured to form the ground plane. A method of assembling an electrically operated aerosol generating device is also provided.

13 Claims, 5 Drawing Sheets

(56) References Cited

U.S. PATENT DOCUMENTS

| | | |
|---|---|---|
| 5,625,396 A | 4/1997 | Keefe et al. |
| 5,750,964 A | 5/1998 | Counts et al. |
| 5,953,029 A | 9/1999 | Keefe et al. |
| 9,368,886 B2 | 6/2016 | Kallee |
| 9,854,844 B2 | 1/2018 | Plojoux et al. |
| 9,993,025 B2* | 6/2018 | Alarcon ............... A24F 47/008 |
| 2003/0190837 A1 | 10/2003 | Wu |
| 2005/0268911 A1 | 12/2005 | Cross et al. |
| 2008/0257367 A1 | 10/2008 | Paterno et al. |
| 2010/0307518 A1 | 12/2010 | Wang |
| 2011/0126848 A1 | 6/2011 | Zuber et al. |
| 2012/0231677 A1 | 9/2012 | Kallee |
| 2014/0366899 A1 | 12/2014 | Plojoux et al. |
| 2014/0373833 A1* | 12/2014 | Liu ...................... A61M 11/042 128/202.21 |
| 2015/0128976 A1* | 5/2015 | Verleur ................ A24F 47/008 131/329 |
| 2015/0237915 A1* | 8/2015 | Liu ........................ A24D 3/043 131/329 |
| 2015/0305409 A1* | 10/2015 | Verleur ................ H02J 7/0022 131/329 |
| 2016/0192705 A1* | 7/2016 | Borkovec ............. A24F 47/008 131/328 |
| 2016/0235119 A1* | 8/2016 | Liu ...................... H02J 7/0042 |
| 2016/0249684 A1* | 9/2016 | Liu ...................... A24F 47/008 131/328 |
| 2016/0278436 A1* | 9/2016 | Verleur ................ A24F 47/008 |
| 2016/0366935 A1* | 12/2016 | Liu ...................... A24F 47/008 |
| 2016/0366936 A1* | 12/2016 | Liu ...................... A24F 47/008 |
| 2017/0035109 A1* | 2/2017 | Liu .......................... H05B 3/24 |
| 2018/0070636 A1* | 3/2018 | Ruscio ................ H05K 1/0213 |

FOREIGN PATENT DOCUMENTS

| | | |
|---|---|---|
| CN | 203466247 U | 3/2014 |
| EP | 1 989 946 A1 | 11/2008 |
| EP | 2 159 176 A1 | 3/2010 |
| EP | 2 327 318 A1 | 6/2011 |
| EP | 2 835 063 A1 | 2/2015 |
| GB | 2502162 A | 11/2013 |
| JP | 2012-506263 | 3/2012 |
| WO | WO 2009/118085 A1 | 10/2009 |
| WO | WO 2011/063970 A1 | 6/2011 |
| WO | 2013/102615 A2 | 7/2013 |
| WO | 2013/142678 A1 | 9/2013 |
| WO | WO 2015/018479 A1 | 2/2015 |

OTHER PUBLICATIONS

International Search Report and Written Opinion of the International Searching Authority dated Oct. 6, 2015 in PCT/EP2015/054823 filed Mar. 9, 2015.

International Preliminary Report on Patentability dated Mar. 23, 2016 in PCT/EP2015/054823 filed Mar. 9, 2015.

Japanese Office Action with English translation dispatched on Feb. 7, 2019 in corresponding Japanese Patent Application No. 2016-555761, citing documents AA and AO therein (4 pages).

Combined Office Action and Search Report dated Jun. 29, 2018 in Taiwanese Patent Application No. 104108012 (submitting English language translation only) citing references AO and AP therein, 10 pages.

* cited by examiner

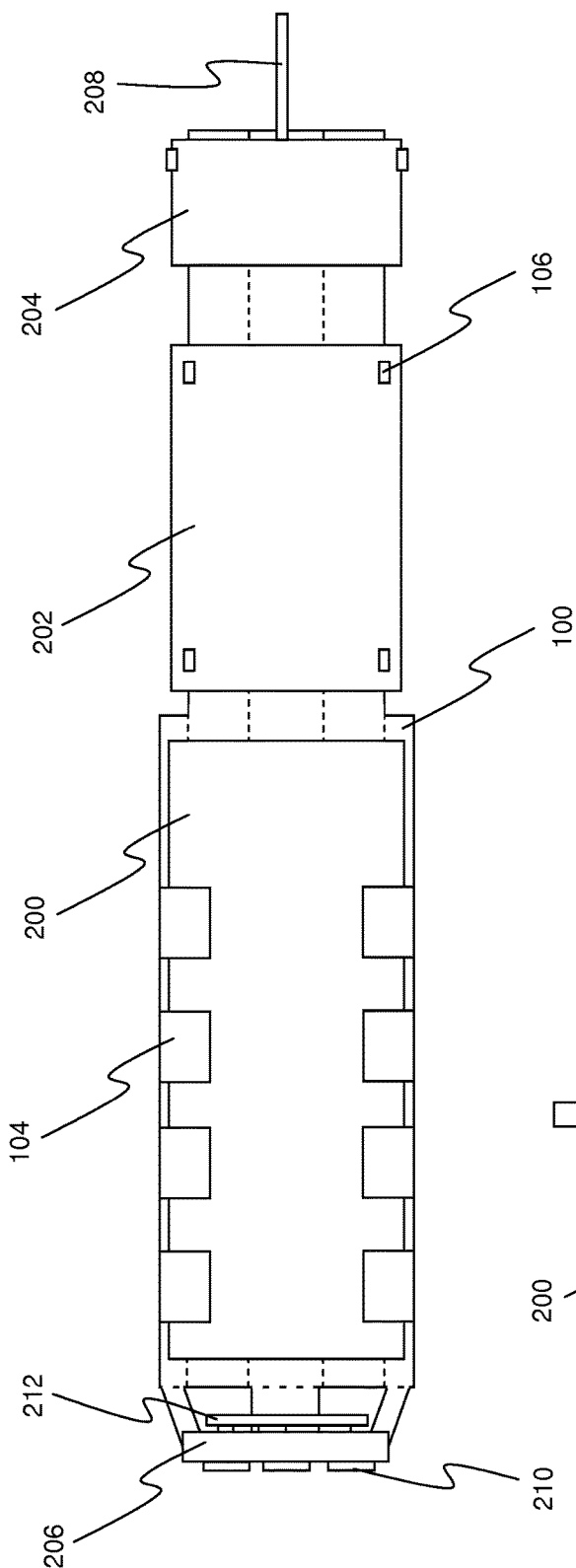
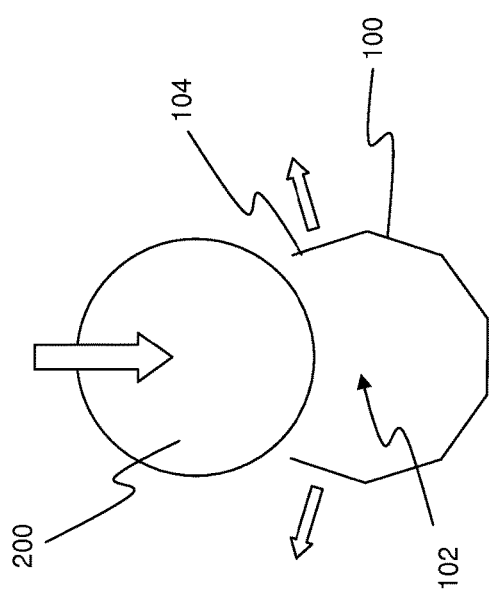
Figure 2(a)
Figure 2(b)

MONOLITHIC PLANE WITH ELECTRICAL CONTACTS AND METHODS FOR MANUFACTURING THE SAME

The present disclosure relates to a monolithic plane with electrical contacts and methods for manufacturing of the same. The present disclosure also relates to an electrically operated aerosol generating device having a ground plane configured to electrically and structurally couple the device components together. The present disclosure also relates to the ground plane for such a device and a single laminar blank for forming the ground plane. A method of assembling an electrically operated aerosol generating device including a monolithic plane is also provided.

Electrically heated smoking systems are known. For example, aerosol generating systems, which operate at lower temperatures than conventional lit end cigarettes, are disclosed in WO2009/118085. WO2009/118085 discloses an aerosol generating system that is an electrical smoking system in which an aerosol-forming substrate is heated by a heater element to generate an aerosol. The electrical smoking system also comprises a power supply and an electronic control circuit. The components of the electrical smoking system are housed within a housing of approximately equivalent diameter to a conventional lit end cigarette which can be challenging. The limited dimensions of the electrical smoking system also increase the difficulty of providing suitable electrical connections between the various components.

It would thus be desirable to provide an electrically operated aerosol generating device that can be more easily manufactured. It would also be desirable to provide improved methods and apparatuses for providing electrical connections between the various system components of aerosol generating systems.

According to a first aspect of the present disclosure, there is provided an electrically operated aerosol generating device, comprising: an electrical power supply; an electronic circuit board; an electrical heating element configured to receive power from the electrical power supply via the electronic circuit board; and a ground plane. The ground plane comprises an elongate conductive member configured to electrically couple the power supply to the electronic circuit board and the electrical heating element or elements, and structurally retain the power supply and plurality of components of the electrically operated aerosol generation device.

By providing such a ground plane, the size and complexity of the aerosol generating device can be reduced. Furthermore, providing such a ground plane reduces the complexity of the manufacturing process because the components can be coupled both electrically and structurally before being inserted into the housing of the aerosol generating device.

As used herein, the term ground plane refers to an electrically conductive surface that appears as an infinite ground potential to the components of the electrically operated aerosol generating device.

As used herein, the term length is a distance in the longitudinal direction of the aerosol generating device. Consequently, the term width is a distance in the transverse direction of the aerosol generating device.

The ground plane is preferably configured to form a cavity adapted to receive and retain the power supply. The cavity is preferably in the form of a channel having a width of the open portion of the channel less than the width of the power supply. At least the portion of the ground plane forming the channel is preferably resilient such that the power supply may be inserted into the channel by increasing the width of the open portion of the channel. Preferably, the inner surface of the channel is configured to electrically connect the power supply to the ground plane. By providing multiple electrical contact points a set of parallel resistances may be provided.

Preferably, the ground plane further comprises a plurality of resilient elements configured to retain the power supply. Preferably, each resilient element is an electrical contact configured to connect the ground plane to the power supply. The ground plane is preferably connected to the negative terminal of the power supply.

The plurality of resilient elements are preferably configured to retain the power supply utilising a snap-fit. The resilient elements are configured to be movable from a first position to a second position. In the second position, a gap is provided between the resilient elements suitable for receiving the power supply. In the first position, the resilient elements act on the power supply to retain it within the cavity formed in the ground plane.

That is to say, the power supply can be forced between the plurality of resilient elements such that the power supply is positioned on the ground plane within the resilient elements. During this process, the resilient elements are initially forced apart as the power supply passes between them, and once the widest portion of the power supply has passed through the resilient elements, the resilient elements snap back to their original position retaining the power supply within the ground plane.

The ground plane is preferably configured to be multi-faceted. The number of faces of the ground plane may not be constant along the longitudinal axis of the ground plane. Preferably, the portion of the ground plane forming the cavity comprises seven faces. In this case, two of the faces are formed by the resilient elements. The remaining portion of the ground plane preferably comprises three faces. By changing the number of faces along the longitudinal axis, the components of the aerosol generator may be coupled to the ground plane more easily.

The ground plane preferably further comprises a plurality of pins configured to receive the electronic circuit board. The plurality of pins are preferably configured to be parallel to each other. The plurality of pins are preferably symmetric about the longitudinal axis of the ground plane. Where the ground plane comprises a portion with three faces, the pins are preferably connected to the longitudinal edges of the first and third of those three faces. Although discussed herein in the context of conveying power from a battery to a circuit board, it will now be apparent to one of ordinary skill in the art that the discussion is not limited to power transfer. Any electrical signal, for example, a data signal, may also be transmitted via the pins when provided in combination with suitable additional electronics.

Preferably, the ground plane is substantially symmetrical about its longitudinal axis. Thus, advantageously, the ground plane can be manufactured more easily because the ground plane does not have to be oriented with a specific side facing a specific direction before assembly.

Preferably, the ground plane is configured to provide an electrical resistance between the power supply and the electronic circuit board of between about 10 milliohm (mΩ) and about 20 milliohm (mΩ). Advantageously, providing such a resistance enables the power supply to be utilised efficiently.

The ground plane is preferably manufactured from a single laminar sheet of conductive material. Preferably, the material is a metal, preferably brass. Utilising brass to manufacture the ground plane is advantageous because it is suitably malleable to allow the ground plane to be folded into the required shape, is suitable resilient to retain the power supply, and can be soldered to enable the circuit board to be connected. In addition, the use of brass enables a suitable electrical resistance to be provided between the components of the aerosol generating device. Alternatively, the material may comprise a copper alloy, a copper and nickel alloy, or copper beryllium alloy. The material may have a thickness of between about 0.05 mm to about 1.0 mm, and may preferably have a thickness of about 0.2 mm. It will now be apparent to one of ordinary skill in the art that other appropriate thickness can be determined based on bending resistance, thickness of the material used, and the required support.

Preferably, the power supply is a battery, more preferably a rechargeable battery. Where the power supply is a rechargeable battery, the aerosol generating device preferably further comprises a plurality of electrical connections configured to connect to an external power supply. The external power supply is configured to recharge the rechargeable battery.

The aerosol generating device may further comprise an aerosol forming substrate configured to form an aerosol when heated by the electrical heater.

The electrical heater may comprise at least one internal heater. Preferably the internal heater is in the form of a blade. The blade is preferably configured to be insertable into the aerosol forming substrate.

In addition, or instead of, the internal heater, the electrical heating element may comprise at least one external heater. The at least one external heater is preferably configured to at least partially surround the aerosol forming substrate, such that in use the aerosol forming substrate may be heated by the external heater. As such, the electrical heating element may comprise at least one internal heater, and at least one external heater.

The ground plane of the aerosol generating device is preferably mounted within a housing. A portion of the cross-sectional shape of the ground plane is preferably substantially similar to the equivalent portion of the cross-sectional shape of the housing. Preferably, the cross-sectional shape of the housing is polygonal, and may comprise 10 sides; that is to say, it may comprise 10 faces such that the housing is multi-faceted. Where the cross-sectional shape of the housing comprises 10 sides (faces), the ground plane preferably comprises seven sides with three sides (faces) not present. In this way, the three sides (faces) of the cross-sectional shape of the ground plane that are not present allows for the positive electrical connections to be provided within the housing. In addition, the three sides not present enable the components of the aerosol generating device to be inserted within the ground plane.

According to a further aspect of the present disclosure, there is provided a ground plane for an electrically operated aerosol generation device, comprising an elongate conductive member. The elongate conductive member is configured to electrically couple a power supply to a plurality of components of the electrically operated aerosol generation device, and structurally retain the power supply and plurality of components of the electrically operated aerosol generation device.

Advantageously, providing such a monolithic ground plane reduces the complexity of the manufacturing process because the components can be coupled both electrically and structurally before being inserted into the housing of an aerosol generating device.

Preferably, the elongate conductive member comprises a plurality of elongate portions, wherein a first elongate portion is connected to a further elongate portion along one longitudinal edge, a second elongate portion is connected to a further elongate portion along one longitudinal edge, and the remaining elongate portions are connected along both longitudinal edges, such that the ground plane may be formed having a polygonal cross-section with at least one side not present.

The ground plane preferably further comprises two sets of resilient elements configured to structurally retain the power supply, wherein the first set of resilient elements are connected to the first elongate portion and the second set are connected to the second elongate portion. Preferably, each set of resilient elements comprises a plurality of resilient elements. Each set may comprise 2, 3, 4, 5, most preferably 6, or more, resilient elements.

According to a yet further aspect of the present disclosure, there is provided a single laminar blank for forming a ground plane as described herein. The single laminar blank comprises a plurality of elongate portions configured to form the elongate conductive member of the ground plane. The elongate portions are connected along longitudinal fold lines. Advantageously, by providing such a single laminar blank, the ground plane may be formed more easily.

The single laminar blank is preferably formed utilising a stamping operation. Alternatively, the single laminar blank may be formed by etching, machining, laser cutting or any other suitable manufacturing process.

Preferably, the fold lines comprise a plurality of perforations configured to reduce the force required to fold the elongate portions to form the ground plane.

Preferably, one of the elongate portions further comprises a plurality of through holes configured to allow the single laminar blank to be positioned within a folding machine. Providing such through holes advantageously allows the single laminar blank to be positioned within the folding machine more quickly. The plurality of through holes are preferably asymmetric about the transverse mid-line of the single laminar blank such that the single laminar blank may only be positioned within the folding machine in one orientation.

According to a still further aspect of the present disclosure, there is provided a method of assembling an electrically operated aerosol generating device as described herein. The method comprises: forming a ground plane by folding a plurality of connected elongate electrically conductive elements; inserting an electrical power supply into the formed ground plane, such that it is structurally retained by the plurality of elongate portions, and electrically coupled to the ground plane; connecting an electronic circuit board to the ground plane; and connecting an electrical heating element to the ground plane.

Preferably, the method further comprises aligning the ground plane within a folding machine, prior to folding the plurality of connected elongate electrically conductive elements. The ground plane is preferably aligned utilising a plurality of through holes in the ground plane engaging with corresponding lugs in the folding machine.

Preferably, a portion of the folded ground plane forms a cavity bounded by the elongate elements. At least two opposing elongate elements forming the cavity are resilient elements configured to retain the power supply. The method preferably further comprises inserting the power supply into the cavity by moving the resilient elements from a first position to a second position. The resilient elements returning to the second position when the power supply is within the cavity to retain the power supply.

According to a still further aspect of the present disclosure, there is provided a ground plane for an electrical device, comprising an elongate conductive member configured to: electrically couple a power supply to a plurality of components of the electrical device; and structurally retain the power supply and plurality of components of the electrical device, wherein the elongate conductive member comprises a plurality of resilient elements, movable from a first position to a second position, configured to retain the power supply, each resilient element being an electrical contact configured to connect the ground plane to the power supply, and, wherein in the second position, a gap is provided between the resilient elements suitable for receiving the power supply, and in the first position, the resilient elements act on the power supply to retain it within the cavity formed in the ground plane.

Advantageously, providing such a ground plane enables an electrical device to be manufactured more easily.

According to a yet still further aspect of the present disclosure, there is provided an electronic circuit board comprising electronic components on a first side and external electrical connections on a second side. In use, the first side of the electronic circuit board is provided internally to a housing, and the second side of the electronic circuit board is provided externally to the housing. Advantageously, providing such an electronic circuit board reduces the complexity of a device requiring external connections. The second side of the electronic circuit board is preferably adapted to be an external face of the housing.

Preferably, the second side is adapted to be an external face of the housing. The second side bending pattern may be configured to a shape consistent with the internal shape of the housing.

The electrically operated aerosol generating device as described herein may comprise such an electronic circuit board. In this embodiment, the electronic circuit board having external connections preferably acts as an interface between the circuit board of the aerosol generating device and an external device. The interface may provide connections for electrical power to enable charging of a rechargeable battery within the aerosol generating device, and the interface may provide connections for data communication between the external device and the aerosol generating device circuit board. Preferably, the electronic circuit board having external connections is configured to be electrically coupled to the ground plane of the aerosol generating device.

The disclosure extends to methods and apparatus substantially as herein described with reference to the accompanying drawings.

As used herein, means plus function features may be expressed alternatively in terms of their corresponding structure.

Any feature in one aspect described in the disclosure here may be applied to other features discussed herein, in any appropriate combination. In particular, method aspects may be applied to apparatus aspects, and vice versa. Furthermore, any, some or all features in one aspect can be applied to any, some or all features in any other aspect, in any appropriate combination.

It should also be appreciated that particular combinations of the various features described and defined in any aspects of the various features can be implemented or supplied or used independently.

The invention will be further described, by way of example only, with reference to the accompanying drawings in which:

FIG. 2(a) shows a top view of the ground plane of FIG. 1 with the components of an electrically operated aerosol generating device located in position;

FIG. 2(b) shows a power supply being inserted into the ground plane;

Figure 1:
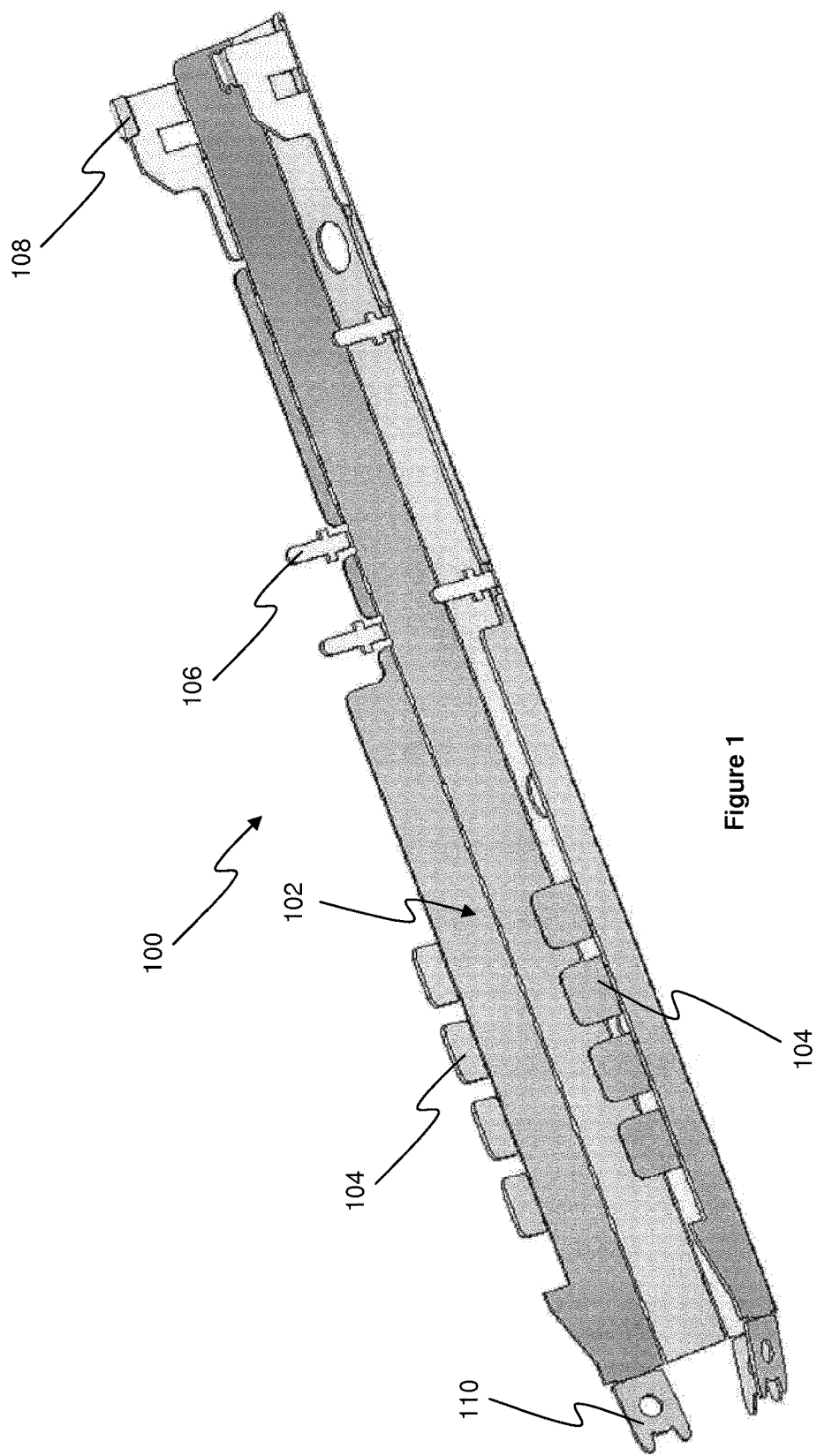
FIG. 1 shows a perspective view of a ground plane for use in an electrically operated aerosol generating device.
Figure 3:
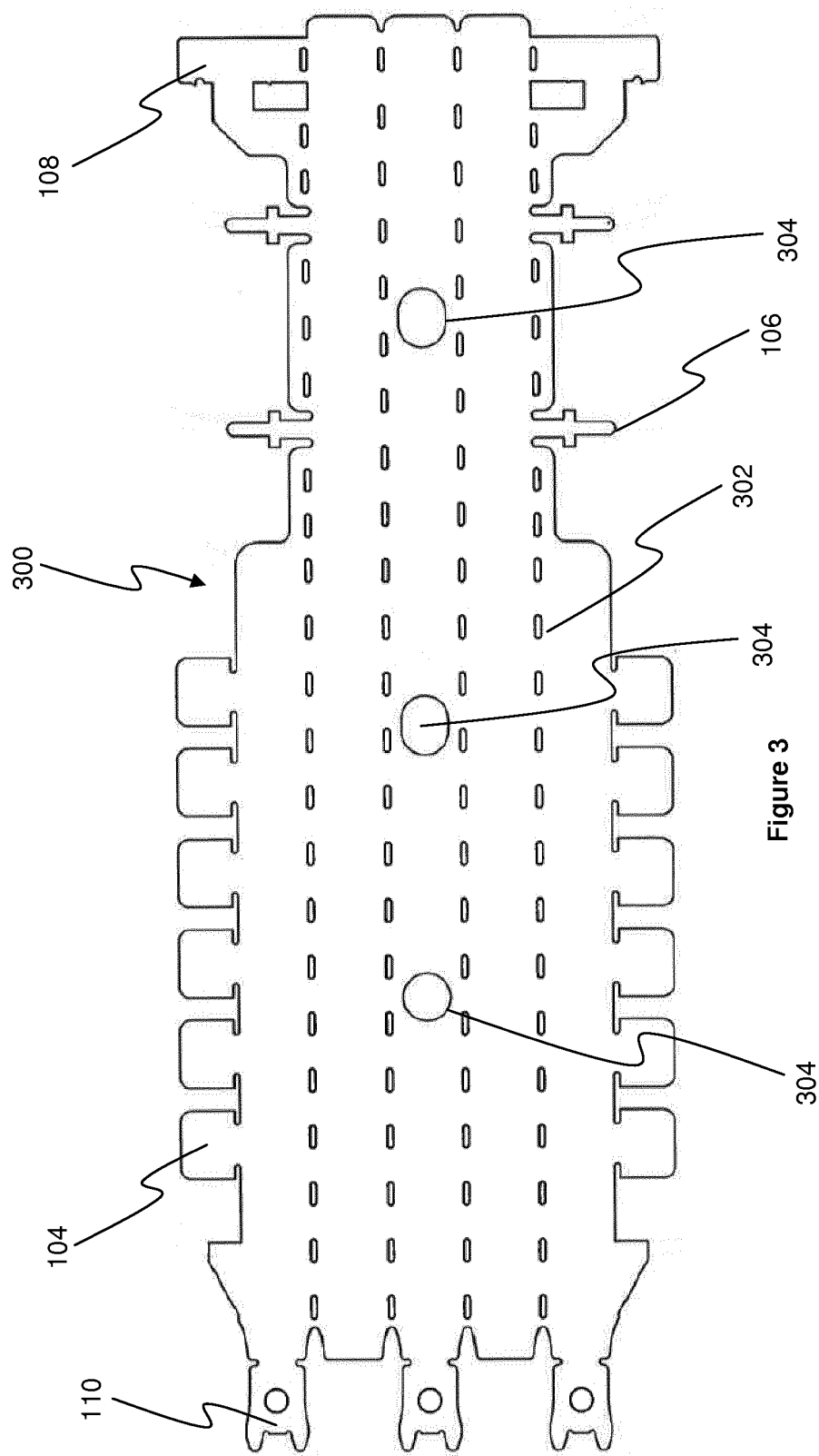
FIG. 3 shows a single laminar blank configured to form the ground plane of FIGS. 1 and 2.
Figure 4:
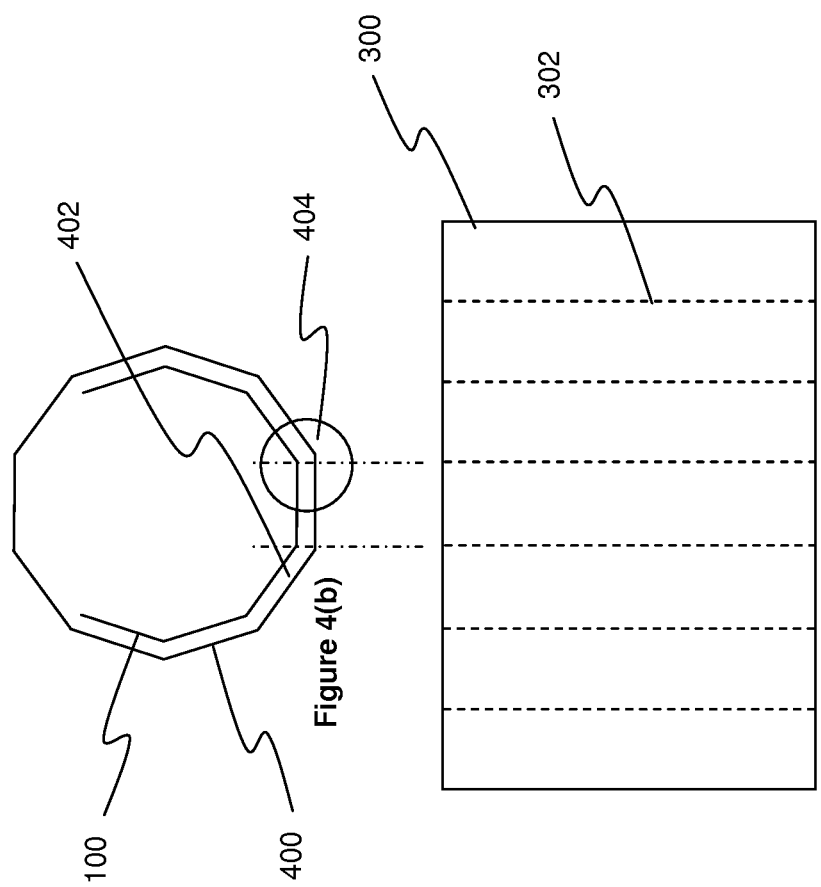
FIG. 4 illustrates a relationship between the interior surface of a device utilizing a ground plane and the device.
Figure 5:
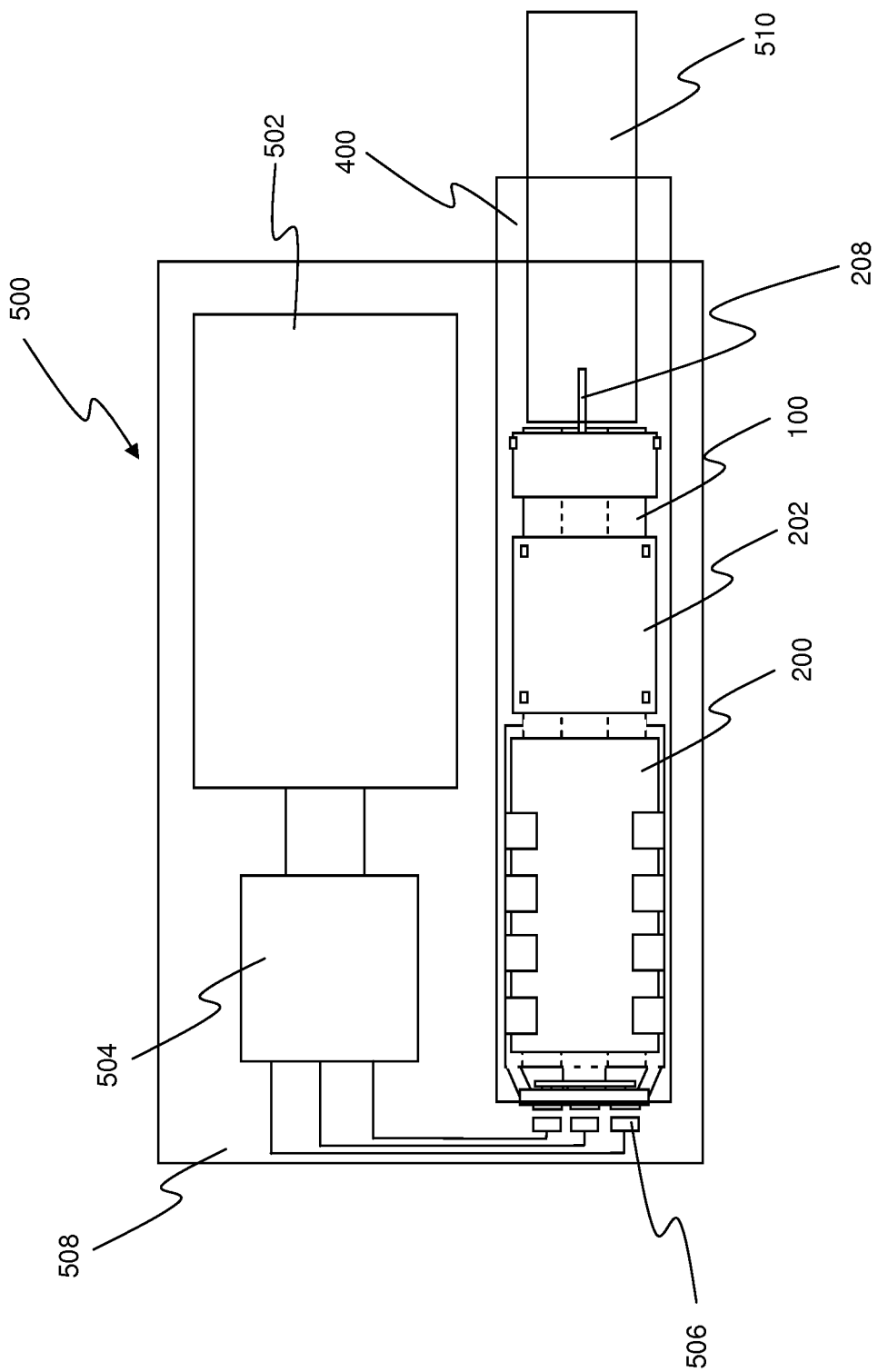
FIG. 5 illustrates a system including an aerosol generating device having a ground plane, an aerosol generator, and a main unit.

FIG. 1 shows a perspective view of a ground plane 100 for use in an electrically operated aerosol generating device. The aerosol generating device is described in further detail below. The ground plane comprises a plurality of faces in the form of elongate electrically conductive elements which are described in further detail below with reference to FIG. 3. The plurality of elongate elements are configured to form a cavity 102 along a portion of the ground plane. The cavity 102 is bounded by the plurality of elongate elements, and the resilient elements 104. The cavity is configured to receive an electrical power supply for the aerosol generating device. The ground plane further comprises a plurality of pins 106 configured to receive an electronic circuit board, such as a PCB. The portions 108 are provided to connect an electrical heating element of the aerosol generating device. Finally, the portions 110 are provided to connect a circuit board configured to act as an interface between the aerosol generating device and an external device, such as a charging unit.

The ground plane is manufactured by stamping a single laminar blank. The single laminar blank is then folded in a single process to form the multi-faceted ground plane 100. Utilising a plurality of faces for the ground plane enables a simple folding process to be used. However, an alternative bending process may be used to form a curved cross-sectional profile. The ground plane is manufactured from brass. Utilising brass enables the ground plane to be folded easily, and allows components to be soldered to the ground plane where necessary.

FIG. 2(a) shows the ground plane 100 with components of an aerosol generating device mounted thereto. As can be seen, the power supply 200 in the form of a rechargeable battery is mounted within the cavity 102, the electronic circuit board 202 is mounted on the pins 106, the electrical heater 204 is mounted on the mounting portions 108, and the interface circuit board 206 is mounted to the mounting portions 110. The electrical heater 204 comprises a heating element 208.

The power supply 200 is retained within the cavity 102 by the resilient elements 104. As can be seen, the resilient elements 104 are in the form of two sets of fingers configured to act on the power supply when it is within the cavity. During assembly, the power supply 200 is pushed into the cavity 102 as shown in FIG. 2(b). The resilient elements 104 move from the position shown in FIG. 2(b) as the power supply acts on the resilient elements, and when the power supply has passed through the opening between the resilient elements they move back to the position shown in FIG. 2(b) to retain the power supply within the cavity 102 of the ground plane 100. Utilising resilient elements in such a way reduces the complexity of manufacturing an aerosol generator.

In addition, the resilient elements are configured to electrically couple the negative terminal of the power supply to the ground plane. Utilising multiple resilient elements acting as electrical connectors between the power supply and the ground plane provides parallel resistance paths that increase the efficiency of the device.

As shown in FIG. 2(*a*), an electronic circuit board 202 is mounted to the ground plane on the pins 106. The electronic circuit board 202, once placed on the pins 106, is soldered in place. The pins 106 also electrically couple the circuit board 202 to the ground plane 100. An electrical heater 204 is also mounted to the ground plane 100. The electrical heater is mounted to the ground plane by the mounting portions 108. The mounting portions also electrically couple the heater to the ground plane 100. Finally an interface circuit board 206 is mounted to the ground plane by the mounting portions 110. The mounting portions 110 also electrically couple the interface circuit board 206 to the ground plane 100.

As will be appreciated from the above description, the power supply, electronic circuit board, electrical heater, and the interface circuit board are all electrically coupled together by the ground plane.

Also as shown in FIG. 2(*a*), the interface circuit board 206 comprises external connectors 210, and internal circuitry 212. The external connectors 210 are mounted directly to one side of the circuit board 206. Likewise, the circuitry 212 is mounted directly to the other side of the circuit board 206. The external connectors 210 are connected to the circuitry 212 via connections through the circuit board 206. The operation of the interface circuit board is described in further detail below.

The ground plane 100, comprising the power supply 200, circuit board 202, electrical heater 204 and the interface circuit board 206 is mounted within an external housing (not shown) to form an electrically operated aerosol generating device. By providing all of the components of the aerosol generating device on a monolithic sub-structure the device can be manufactured more easily. The ground plane is inserted into the housing of the device such that the external connectors 210 are exposed at one end of the device. The housing of the device incorporates a cavity configured to surround the heater 208. The heater cavity is adapted to receive an aerosol forming substrate.

The housing has a regular polygonal cross-sectional shape comprising 10 sides, and as can be seen, the ground plane has an equivalent cross-sectional shape, but with three sides not present in the region of the power supply.

In use, the heating element receives power from the power supply via the circuit board in order to heat the aerosol forming substrate to form an aerosol.

FIG. 3 shows a single laminar blank 300 for forming the ground plane 100 as described above. The single laminar blank is manufactured by a single stamping process. As can be seen, the blank is substantially symmetrical about its longitudinal axis which enables the blank to be inserted into a folding machine either way up. The blank comprises a series of elongate conductive elements connected together along their respective longitudinal edges. The perforations 302 are provided along the connecting edges to enable the blank to be folded more easily. The three holes 304 are provided in the central elongate element to enable the blank to be oriented within the folding machine. The holes are configured to engage with corresponding lugs in the folding machine. As can be seen, the holes 304 are asymmetric about the transverse axis of the blank such that the blank can only be positioned within the machine in one orientation.

The ground plane 100 is formed by folding the blank 300 in a folding machine. As described above, the housing configured to receive the ground plane has a 10 sided regular polygonal cross-sectional shape, and as such, in the folding operation each elongate element is folded by 36 degrees relative to the adjacent elongate element. The pins 106 and the mounting portions 108 are folded such that they are substantially parallel to each other, and perpendicular to the central elongate element comprising the holes 304. The ground plane may be formed offline, or online. That is to say, the ground plane may be folded and then transferred to a secondary machine to incorporate the aerosol generating device components, or the ground plane may be folded and the components inserted in a single operation.

FIG. 4 illustrates the relationship between ground plane 100 and a device 400 that receives the ground plane. It will now be apparent to one of ordinary skill in the art that the ground plane 100 may be formed of a variety of shapes. It will now further be apparent to one of ordinary skill in the art that this shape may be defined based on an interior surface 402 of device 400. As illustrated in FIG. 4, the perforation pattern of perforations 302 may be chosen such that a common point 404 of the interior surface 402 and ground plane 100 coincide. Device 400 may, for example, be an aerosol generating device having an interior surface; such an aerosol generating device is described in further detail below with reference to FIG. 5. The perforation pattern of perforations 302 may be chosen for blank 300 such that a bend is formed in ground plane 100, where the bend corresponds to the common point 404. Thus, it is possible to choose the ground plane perforation pattern in such a manner that the pattern is chosen for blank 300 and a suitable shape of the ground plane 100 is formed to match the interior surface of device 400.

The electrically operated smoking system illustrated in FIG. 5 comprises a main charging unit 500 configured to receive a an electrically operated aerosol generating device 400. The main charging unit comprises a power source 502, such as a rechargeable battery, charging control electronics 504, and electrical connectors 506 configured to couple the device 400 to the battery 502 via the control electronics 504. The device is received in a cavity of the main charging unit.

As described above with reference to FIGS. 2, the aerosol-generating device 400 comprises an internal heating element 208. The heating element 208 is mounted within a smoking article receiving chamber of the aerosol-generating device 400. In use, the user inserts a smoking article 510 into the smoking article receiving chamber of the aerosol-generating device 400 such that the internal heating element 208 is inserted into an aerosol-forming substrate of the smoking article 510. In the embodiment shown in FIGS. 2 and 5, the internal heating element 208 of the aerosol-generating device 400 is a heater blade.

The aerosol-generating device 400 comprises a power supply and electronics that allow the internal heating element 208 to be actuated. Such actuation may be manually operated or may occur automatically in response to a user drawing on a smoking article 510 inserted into the smoking article receiving chamber of the aerosol-generating device 400. A plurality of openings (not shown) is provided in the aerosol-generating device to allow air to flow to the smoking article 510.

In use, the internal heating element of the aerosol-generating device heats the aerosol-forming substrate of the smoking article 510 to a sufficient temperature to form an aerosol, which is drawn downstream through the smoking article 510 and inhaled by the user.

The power supply 200 of the aerosol generating device 400 is provided with sufficient capacity for a single smoking article 510 to be fully aerosolised. The device 400 must then be recharged by the main charging unit 500. In use, the user inserts the device 400 into the receiving cavity of the main unit 500, and activates the charging process, either by activating a switch, or automatically by closing a lid (not shown) of the main unit 500.

The exemplary embodiments described above are not limiting. Other embodiments consistent with the exemplary embodiments described above will be apparent to those skilled in the art.

The invention claimed is:

1. An electrically operated aerosol generating device, comprising:
    an electrical power supply;
    an electronic circuit board;
    an electrical heating element configured to receive power from the electrical power supply via the electronic circuit board; and
    a ground plane comprising an elongate conductive member configured to:
        electrically couple the electrical power supply to the electronic circuit board and the electrical heating element, and
        structurally retain the electrical power supply and plurality of components of the electrically operated aerosol generation device,
    wherein the ground plane is configured to form a cavity configured to receive and to retain the power supply, and
    wherein the ground plane further comprises a plurality of resilient elements configured to retain the electrical power supply and each resilient element of said plurality of resilient elements is an electrical contact configured to connect the ground plane to the electrical power supply.

2. The electrically operated aerosol generating device according to claim 1, wherein the plurality of resilient elements are configured to retain the electrical power supply utilising a snap-fit.

3. The electrically operated aerosol generating device according to claim 1, wherein the ground plane further comprises a plurality of pins configured to receive the electronic circuit board.

4. The electrically operated aerosol generating device according to claim 1, wherein the ground plane is substantially symmetrical about its longitudinal axis.

5. The electrically operated aerosol generating device according to claim 1, configured to have an electrical resistance between the electrical power supply and the electronic circuit board of between about 10 mΩ and about 20 mΩ.

6. The electrically operated aerosol generating device according to claim 1, wherein said electrical heating element is in a form of a blade.

7. The electrically operated aerosol generating device according to claim 1, wherein said electrical heating element comprises at least one external heater.

8. The electrically operated aerosol generating device according to claim 1, wherein said electrical heating element comprises at least one internal heater and at least one external heater.

9. The electrically operated aerosol generating device according to claim 1, wherein the ground plane is manufactured from brass.

10. A method of assembling an electrically operated aerosol generating device, comprising:
    forming a ground plane by folding a plurality of connected elongate electrically conductive portions, the ground plane having a cavity bounded by the elongate electrically conductive portions;
    inserting an electrical power supply into the cavity of the thrilled ground plane, such that it is structurally retained by the plurality of elongate portions and electrically coupled to the ground plane;
    connecting an electronic circuit board to the ground plane; and
    connecting an electrical heating element to the ground plane.

11. The method of assembling an electrically operated aerosol generating device according to claim 10, further comprising providing a plurality of perforations used to form the ground plane, the plurality of perforations being formed in a manner consistent with an interior surface of the electrically operated aerosol generating device.

12. An electrically operated aerosol generating device, comprising:
    an electrical power supply;
    an electronic circuit board;
    an electrical heating element configured to receive power from the electrical power supply via the electronic circuit board; and
    a ground plane comprising an elongate conductive member configured to:
        electrically couple the electrical power supply to the electronic circuit board and the electrical heating element, and
        structurally retain the electrical power supply and plurality of components of the electrically operated aerosol generation device,
    wherein the ground plane is configured to form a cavity configured to receive and to retain the power supply, and
    wherein the ground plane further comprises a plurality of pins configured to receive the electronic circuit board.

13. An electrically operated aerosol generating device, comprising:
    an electrical power supply;
    an electronic circuit board;
    an electrical heating element configured to receive power from the electrical power supply via the electronic circuit board; and
    a ground plane comprising an elongate conductive member configured to:
        electrically couple the electrical power supply to the electronic circuit board and the electrical heating element, and
        structurally retain the electrical power supply and plurality of components of the electrically operated aerosol generation device,
    wherein the ground plane is configured to form a cavity configured to receive and to retain the power supply, and
    wherein the electrically operated aerosol generating device is configured to have an electrical resistance between the electrical power supply and the electronic circuit board of between about 10 mΩ and about 20 mΩ.

* * * * *